United States Patent Office 3,711,553
Patented Jan. 16, 1973

3,711,553
TRICYCLIC KETONES
Hans Schmid, Schwerzenbach, and Janos Zsindely, Dubendorf, Switzerland, assignors to Hoffmann-La Roche Inc., Nutley, N.J.
No Drawing. Filed Feb. 24, 1969, Ser. No. 801,796
Claims priority, application Switzerland, Mar. 15, 1968, 3,899/68
Int. Cl. C07c *49/36, 49/38*
U.S. Cl. 260—586 R                    8 Claims

ABSTRACT OF THE DISCLOSURE

Tricyclo[3,2,1,0$^{2,7}$]-octen-3-en-8-ones which are useful in the perfumery art and a process for their preparation from phenols including intermediates in this process.

SUMMARY OF THE INVENTION

This invention relates to novel compounds of the Formula I

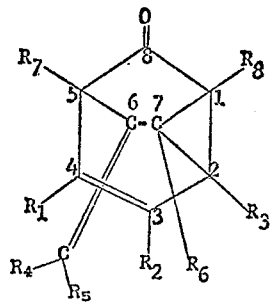

wherein $R_1$, $R_2$ and $R_3$ are independently selected from the group consisting of hydrogen, halgen, hydroxy, lower alkyl, lower alkyloxy, lower alkylamino, amino, di(lower alkyl)amino, mercapto and lower alkyl mercapto; $R_4$ and $R_5$ are independently selected from the group consisting of hydrogen, lower alkyl and lower alkoxy; $R_6$ is hydrogen or lower alkyl and $R_7$ and $R_8$ are independently selected from the group consisting of hydrogen, lower alkyl and lower alkoxy with the proviso that at least one of $R_7$ and $R_8$ is lower alkyl or lower alkoxy and acid addition salts thereof.

The compounds of Formula I above and their acid addition salts have a camphor-like odor. The compounds of Formula I above and their acid addition salts because of their fragrance are useful in the preparation of perfumes, colognes and other scented compositions.

The compounds of Formula I above can be prepared by heating ethers of the formula

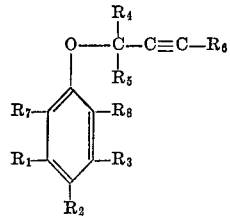

wherein $R_1$, $R_2$, $R_3$, $R_4$, $R_5$, $R_6$, $R_7$ and $R_8$ are as above, or cyclohexadienones of the formula

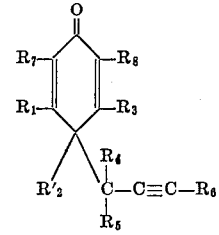

wherein $R_1$, $R_3$, $R_4$, $R_5$, $R_6$, $R_7$ and $R_8$ are as above and $R_2'$ is selected from the group consisting of halogen, hydroxy, lower alkyl, lower alkyloxy, lower alkylamino, amino, di(lower alkyl)amino, mercapto and lower alkyl mercapto to a temperature of from 50° C. to 200° C.

DETAILED DESCRIPTION

The term "halogen" as used throughout the application, includes all four halogens, i.e., bromine, chlorine, fluorine and iodine with chlorine and bromine being preferred. As used throughout the application, the term "lower alkyl" comprehends both straight and branched chain saturated hydrocarbons containing from 1 to 7 carbon atoms such as methyl, ethyl, propyl, isopropyl, etc. The term "lower alkoxy" comprehends lower alkoxy groups containing from 1 to 7 carbon atoms such as methoxy, propoxy, ethoxy, etc., preferably methoxy.

The term "lower alkyl amino" denotes mono lower alkyl amino groups wherein lower alkyl is defined as above. Among the preferred lower alkylamino groups are methylamino and ethylamino. The term "di(lower alkyl) amino" denotes di(lower alkyl)amino groups wherein lower alkyl is defined as above. Among the preferred di(lower alkyl)amino groups are included dimethylamino and diethylamino.

The term "lower alkylmercapto" denotes lower alkylmercapto groups wherein lower alkyl is defined as above. Among the preferred lower alkyl mercapto groups are included methylmercapto, ethylmercapto, etc.

It is to be understood that in case $R_1$ or $R_2$ are selected from the group consisting of hydroxy and amino the corresponding tautomeric forms i.e. the ketones and imines are also encompassed by Formula I.

The compounds of Formula I above which possess basic character form acid addition salts with both inorganic and organic acids. Such acid addition salts are also within the scope of this invention. The compounds of Formula I above which are basic in character can be converted into the salts by reaction with an inorganic or organic acid. Examples of such acids are nitric acid, sulfuric acid, hydrochloric acid, hydrobromic acid, phosphoric acid, acetic acid, citric acid, succinic acid, benzoic acid, formic acid, p-toluene sulfonic acid and the like.

The compounds of Formula II or III above, can be cyclized to form the compound of Formula I above by heating the compounds of the Formula II or III above to a temperature of from 50° C. to about 200° C. Generally, in carrying out this reaction, temperatures of from 150° C. to 200° C. are utilized with temperatures of from about 180° C. to 190° C. being preferred. Generally, the optimum temperature utilized in cyclization will depend upon the particular starting material of Formula II or III above which is utilized. Therefore, the reaction temperature depends upon the nature of the substituents $R_1$, $R_2$, $R_2'$, $R_3$, $R_4$, $R_5$, $R_6$, $R_7$ and $R_8$ in the compounds of Formula II or III above and the particular reaction time. For instance, alkyl substitution in the alpha-position to the ether oxygen in the compound of Formula II above reduces the reaction temperature.

While reaction temperatures of from 150° C. to about 200° C. are generally utilized, the reaction can also take place at temperatures below 150° C. However, temperatures below 50° C. are not utilized in carrying out this reaction since the rate of conversion of compounds of the Formula II or III above to compounds of the Formula I above at these temperatures is very small.

In carrying out this reaction, the reaction mixture should not be heated for an unlimited length of time when temperatures between 180° C. and 200° C. are utilized. This is true since the compound of Formula I above can, at these temperatures, enter into further reactions. Therefore, it is best to check the course of the reaction from time to time. This can be done by withdrawing a small sample from the reaction mixture and subjecting this sample to thin layer chromatography or gas chromatography, or to examine it spectroscopically. This procedure is recommended especially in case of large batches where the reaction times vary somewhat in conditions which in themselves are comparable.

At temperatures of from 150° C. to 200° C., reaction times of from about 3 hours to 16 hours can be generally utilized. Generally, at temperatures of from about 150° C. to about 200° C., it is preferred to utilize reaction times of from about 6 hours to 14 hours. The reaction time depends on the kind of starting material, i.e., on the nature of the substituent $R_1$, $R_2$, $R_2'$, $R_3$, $R_4$, $R_5$, $R_6$, $R_7$ and $R_8$ in the compounds of Formula II or III above and the chosen reaction temperature. Alkyl substitution on the alpha position to the ether oxygen in the compound of Formula II above reduces the reaction time. Furthermore, a reduction of the reaction time can be foregone in favor of an increase in the reaction temperature. In order to suppress any subsequent reaction of the compounds of the Formula I above which are formed in the reaction medium, it may become necessary to isolate the desired compound of Formula I above, from the reaction mixture. Any conventional method of isolating the compound of Formula I above from the reaction mixture can be utilized. Among the conventional methods for isolating the compound of Formula I above from the reaction mixture are included chromatography.

In those cases where the compound of Formula I is produced as a mixture of isomeric compounds these isomeric compounds can be separated into their individual isomers by conventional methods such as chromatography.

In carrying out this reaction, a solvent can be utilized. On the other hand, if desired, no solvent need be utilized. When a solvent is utilized which has a boiling point below the reaction temperature, the reaction should be carried out in a closed system such as in an autoclave or in a bomb-tube. If the boiling point of the solvent is close to the reaction temperature, the reaction can be carried out under reflux conditions. On the other hand, if the solvent has a boiling point above the reaction temperature, the reaction can take place by heating the system to the reaction temperature under atmospheric pressure. Generally, it is preferred that when this reaction is carried out in an open system utilizing atmospheric pressure, a protecting gas such as nitrogen be utilized. In carrying out this reaction, pressure is not critical, and this reaction can be carried out in an open or closed system utilizing either sub-atmospheric pressure, normal pressure, elevated pressure, or very high pressure. When it is desired to utilize an organic solvent, any conventional inert organic solvent can be utilized. Among the preferred inert organic solvents are included n-decane, dodecane, diethylaniline and benzonitrile.

The compound of Formula II can be prepared by reacting a phenolic compound of the formula:

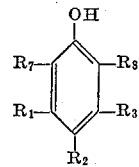

IV wherein $R_1$, $R_2$, $R_3$, $R_7$ and $R_8$ are as above, with a propargyl halide of the formula:

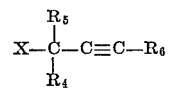

V wherein X is a halide and $R_4$, $R_5$ and $R_6$ are as above, in the presence of an inorganic base. In carrying out this reaction, any conventional inert organic solvent can be used as the reaction medium. Among the preferred inert organic solvents is included acetone and dimethylformamide. Among conventional inorganic bases which can be utilized in carrying out this reaction are included sodium hydroxide, potassium hydroxide, sodium carbonate and potassium carbonate. However in case a dialkyl ketone like acetone is used as an inert organic solvent strongly basic inorganic bases like sodium hydroxide or potassium hydroxide are not suitable for the purposes of the invention. In carrying out this reaction, temperature and pressure are not critical and this reaction can be carried out at room temperature or atmospheric pressure or at elevated temperatures and pressures. Generally, it is preferred to cary out this reaction at the reflux temperature of the reaction medium.

In accordance with another embodiment of this invention, the compound of Formula II can be prepared by reacting a compound of the Formula IV with a compound of the formula:

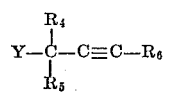

VI wherein $R_4$, $R_5$ and $R_6$ are as above, and

Y is a leaving group.

This reaction is carried out in the presence of an inorganic base. Any conventional inorganic base such as sodium hydroxide, potassium hydroxide, potassium carbonate, etc., can be utilized. Generally, it is preferred to carry out this reaction in the presence of an inert organic solvent. Any conventional inert organic solvent can be utilized. Among the inert organic solvents, acetone in combination with a weak base is preferred. In carrying out this reaction, temperature and pressure are not critical and this reaction can be carried out at room temperature and atmospheric pressure or at elevated temperatures and pressure. Generally, it is preferred to carry out this reaction at the reflux temperature of the reaction medium.

In carrying out the reaction of compounds of the Formula VI with compounds of the Formula IV to produce a compound of the Formula II, Y can be any suitable leaving group such as mesyloxy or tosyloxy.

In accordance with another embodiment of this invention, the compound of the Formula II above can be produced from the compound of Formula IV. In this procedure, the compound of the Formula II above is reacted in the aforementioned manner with either the compound of the Formula V or VI wherein $R_6$ in the compounds of the Formulae V or VI is hydrogen to produce a compound of the formula:

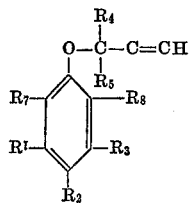

II-a wherein $R_1$, $R_2$, $R_3$, $R_4$, $R_5$, $R_7$ and $R_8$ are as above.

The compound of Formula II-a is then reacted with a halide of the formula:

$$R'_6\text{—}X'$$

wherein $R'_6$ is lower alkyl, and $X'$ is a halogen, in the presence of a base to form the compound of the Formula II, wherein $R_6$ is lower alkyl.

In carrying out this reaction, any conventional base can be utilized. Among the conventional bases are included sodium amide, potassium amide, sodium hydroxide, etc. This reaction is generally carried out in a solvent. Any conventional inert organic solvent can be utilized as the solvent medium. Among the conventional inert organic solvents, liquid ammonia or ether liquid ammonia are preferred. In carrying out this reaction, temperature and pressure are not critical, and atmospheric temperature and pressure can be utilized. If desired, elevated temperatures can be utilized. Generally, it is preferred to carry out this reaction at the reflux temperature of the solvent.

The compound of Formula III can be prepared by reacting a compound of the Formula IV with a compound of Formula V in the presence of copper powder and an inorganic base. This reaction is carried out in the presence of an inert organic solvent. Any conventional solvent can be utilized. Among the conventional solvents, diethyl ether and acetone are preferred. In carrying out this reaction, any conventional inorganic base such as the bases hereinbefore mentioned can be utilized with the preferred base being sodium hydroxide. In carrying out this reaction, temperature and pressure are not critical and this reaction can be carried out at room temperature and atmospheric pressure. If desired, elevated temperatures and pressures can be utilized.

The following examples are illustrative but not limitative of the present invention. In the examples, all temperatures are in degrees centigrade and the ether utilized is diethyl ether.

Example 1

1 g. of 2,6-dimethylphenyl propargyl ether in 2 g. of n-decane are heated at 185° for 9 hours in a degassed, evacuated bomb-tube. After this period, the reaction mixture is chromatographed on 45 g. of silica gel with a hexane-benzene mixture (1 to 1 parts by volume). In this manner, the n-decane and unreacted starting ether are separated off. For further purification, the product is chromatographed on 30 g. of silica gel with a pentane-ether mixture (19:1 parts of volume) and distilled in a bulb-tube. Tricyclo[3,2,1,0$^{2,7}$]-1,5-dimethyl-6-methylidene-oct-3-en-8-one is obtained. B.P. 90–93° (air-bath)/10 mm. Hg (35–40° (air-bath)/0.01 mm. Hg).

Example 2

61 g. of 2,6-dimethylphenol (0.5 mol), 71.9 g. of propargyl bromide (0.6 mol) and 76 g. of freshly ignited and powdered potassium carbonate (0.55 mol) in 115 ml. of acetone are heated at reflux for 14 hours. The inorganic salts are thereupon filtered off. The acetone and the excess propargyl bromide are distilled off via a column and the oily residue is dissolved in pentane. The resulting solution is washed with Claisen's lye (35 g. of caustic potash, 25 ml. of water and 65 ml. of methanol) and water, dried over sodium sulphate, filtered, evaporated and distilled. 2,6-Dimethylphenyl propargyl ether is obtained. B.P.: 50–51°/0.02 mm. Hg.

Example 3

1 g. of 2,6-dimethylphenyl 2'-butynyl ether in 2 g. of n-decane is heated at 185° for 14 hours in a bomb-tube. After this period, the reaction mixture is chromatographed on 45 g. of silica gel with a hexane-benzene mixture (1 to 1 parts by volume). In this manner, n-decane and the unreacted starting ether are separated off. For further purification, the product is chromatographed on 30 g. of silica gel with a pentane ether mixture (19 to 1 parts by volume) and distilled in a bulb-tube. Tricyclo[3,2,1,0$^{2,7}$]-6-methylidene-1,5,7-trimethyl-oct-3-en-8-one is obtained. B.P. 40–45° (air-bath)/0.01 mm. Hg.

Example 4

About 100 ml. of ammonia are condensed at −50° C. in a 3-neck flask. After the addition of 100 mg. of ferric nitrate as catalyst, 4.6 g. (0.2 gram atomic weight) finely cut sodium are introduced portionwise with constant stirring at −40° C. After the sodium amide is formed (about 30 minutes), the solution is allowed to warm a little (−30°) and 20 g. (0.125 mol) of 2,6-dimethylphenyl propargyl ether diluted 1:1 parts by volume with ether are slowly added dropwise. After about 20 minutes, 42.6 g. (0.3 mol) of methyl iodide are added dropwise at the same temperatuer and same dilution. After completion of the reaction, the excess ammonia is evaporated off, the mixture is dissolved in water and pentane. The solution is washed with Claisen's lye and water, dried over sodium sulphate, filtered, evaporated and the residue fractionally distilled in high vacuum. 2,6-dimethylphenyl 2'-butynyl ether is obtained. B.P.: 69–70°/0.015 mm. Hg.

Example 5

1 g. of 2,6-dimethylphenyl α-methylpropargyl ether in 2 g. of n-decane is heated at 185° for 3.5 hours in a bomb-tube. After this period, the reaction mixture is chromatographed on 45 g. of silica gel with a hexane-benzene mixture (1 to 1 parts by volume). In this manner, n-decane and the unreacted starting ether are separated off. For further purification, the product is chromatographed on 30 g. of silica gel with a pentane ether mixture (19 to 1 parts by volume) and distilled in a bulb-tube. Tricyclo[3,2,1,0$^{2,7}$]-6-ethylidene-1,5-dimethyl - oct - 3-en-8-one is obtained. B.P.: 40–45° (air-bath) /0.01 mm. Hg.

Example 6

24.4 g. of 2,6-dimethylphenol (0.2 mol), 38 g. of tosylate of but-1-yn-3-ol (0.17 mol) and 28 g. of freshly ignited potassium carbonate (0.2 mol) are heated at reflux for 50 hours in 200 ml. of dimethylformamide. The inorganic salts are thereupon filtered off, the solution evaporated on the rotary evaporator under reduced pressure and the oily residue dissolved in pentane. The pentane solution is washed three times with Claisen's lye and twice with water, dried over anhydrous sodium sulphate, filtered off and evaporated. The residue is chromatographed on 120 g. of silica gel ,Merck, 0.05–0.2 mm.) with n-hexane. The product is subsequently distilled. 2,6-dimethylphenyl α-methylpropargyl ether is obtained. B.P.: 43.5–44.5°/0.02 mm. Hg.

Example 7

1 g. of mesityl propargly ether in 2 g. of n-decane is heated at 185° for 14 hours in a bomb-tube. After this period, the reaction mixture is chromatographed on 45 g. of silica gel with a hexane-benzene mixture (1 to 1 parts by volume). In this manner, n-decane and the unreacted starting ether are separated off. For further purification, the product is chromatographed on 30 g. of silica gel with a pentane ether mixture (19 to 1 parts by volume)

and distilled in a bulb-tube. Tricyclo[3,2,1,0$^{2,7}$]-6-methyl-idene - 1,3,5 - trimethyl-oct-3-ene-8-one is obtained. B.P.: 65–67° (air-bath/0.75 mm. Hg).

Example 8

13.6 g. of mesitol (0.1 mol), 13.1 g. of propargyl bromide (0.11 mol) and 15.2 g. of freshly ignited potassium carbonate (0.11 mol) are heated at reflux for 15 hours in 25 ml. of acetone. The inorganic salts are thereafter filtered off and the solvent removed on the rotary evaporator under reduced pressure. The residue is dissolved in pentane, washed with Claisen's lye and water, dried with sodium sulphate filtered off, evaporated and distilled. Mesityl propargyl ether is obtained. B.P.: 70–71°/0.05 mm. Hg.

Example 9

0.5 g. of 4-propargyl-2,4,6-trimethyl-cyclohexa-2,5-dien-1-one are heated at 185° for 3 hours in 2 g. of n-decane in a bomb-tube in vacuum. After this period, the reaction mixture is chromatographed on 45 g. of silica gel with a hexane-benzene mixture (1 to 1 parts by volume). In this manner, n-decane and the unreacted starting ether are separated off. For further purification, the product is chromatographed on 30 g. of silica gel with a pentane ether mixture (19 to 1 parts by volume) and distilled in a bulb-tube. Tricyclo[3,2,1,0$^{2,7}$]-6-methylidene - 1,3,5 - trimethyl-oct-3-en-8-one is obtained which is identical with the rearrangement product of mesityl propargyl ether described in Example 7.

Example 10

5.45 g. of mesitol (4.10$^{-2}$ mol) are dissolved in 20 ml. of 2-N-caustic soda (4.10$^{-2}$ mol), a spatula tip of Cu powder is added and, with vigorous stirring at 20°, 3.2 ml. of propargyl bromide (5.05 g.; 4.25×10$^{-2}$ mol) are added dropwise during 10 minutes. The bath-temperature is raised to 70° and left at this temperature for 2 hours.

After this period, the reaction mixture is treated with pentane and washed with 2 N caustic soda and water. The pentane phase is dried with sodium sulphate, filtered and evaporated. The residue is chromatographed on silica gel with benzene. There is obtained 4-propargyl-2,4,6-trimethylcyclohexa-2,5-dien-1-one which is distilled in a bulb-tube (air-bath) (B.P. 55–60°/10$^{-2}$ mm. Hg). The distillate is recrystallized from pentane. M.P.: 43–44.5° C.

We claim:
1. A tricyclic ketone of the formula

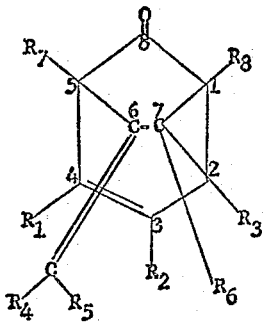

wherein $R_1$ is hydrogen, $R_2$ and $R_3$ are independently selected from the group consisting of hydrogen and lower alkyl; $R_4$ and $R_5$ are independently selected from the group consisting of hydrogen and lower alkyl; $R_6$ is hydrogen or lower alkyl and $R_7$ and $R_8$ are lower alkyl.

2. The ketone of claim 1 wherein said ketone is tricyclo [3,2,1,0$^{2,7}$] - 1,5-dimethyl-6-methylidene-oct-3-en-8-one.

3. The ketone of claim 1 wherein said ketone is tricyclo [3,2,1,0$^{2,7}$] - 6-methylidene-1,5,7-trimethyl-oct-3-en-8-one.

4. The ketone of claim 1 wherein said ketone is tricyclo [3,2,1,0$^{2,7}$] - 1,5-dimethyl-6-methylidene-oct-3-en-8-one.

5. The ketone of claim 1 wherein said ketone is tricyclo [3,2,1,0$^{2,7}$] - 6-methyliden-1,3,5-trimethyl-oct-3-en-8-one.

6. A process for the manufacture of tricyclic ketones of the formula:

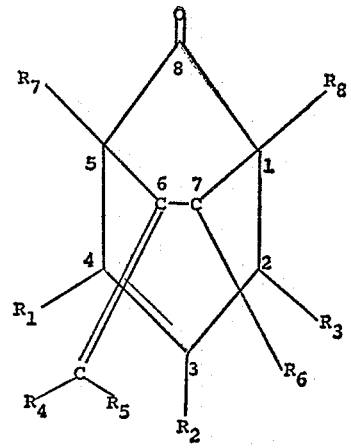

wherein $R_1$ is hydrogen, $R_2$ and $R_3$ are independently selected from the group consisting of hydrogen and lower alkyl; $R_4$ and $R_5$ are independently selected from the group consisting of hydrogen and lower alkyl; $R_6$ is hydrogen or lower alkyl; and $R_7$ and $R_8$ are lower alkyl;

comprising heating to a temperature of from about 50 degrees centigrade to 200 degrees centigrade for a period of from about 3 to 16 hours, a compound of the formula:

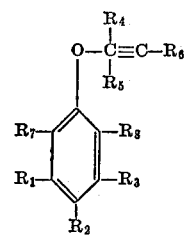

wherein $R_1$, $R_2$, $R_3$, $R_4$, $R_5$, $R_6$, $R_7$ and $R_8$ are as above;

or a compound of the formula:

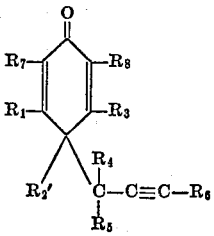

wherein $R_1$, $R_3$, $R_4$, $R_5$, $R_6$, $R_7$ and $R_8$ are as above; and $R'_2$ is lower alkyl;

to form said tricyclic ketone.

7. The process according to claim 6 wherein the reaction is carried out at 150° C. to 200° C.

8. The process according to claim 6 wherein the reaction is carried out at 180° C. to 190° C.

References Cited

UNITED STATES PATENTS

| | | | |
|---|---|---|---|
| 2,995,606 | 8/1961 | Molotsky et al. | 260—586 R |
| 3,420,886 | 1/1969 | Erman | 260—586 R |

OTHER REFERENCES

Iwai et al.: "Chem. Abstracts," vol. 59, p. 13930b, (1963).

Okajima: "Chem. Abstracts," vol. 54, p. 18487h, (1960).

BERNARD HELFIN, Primary Examiner

N. MORGANSTERN, Assistant Examiner

U.S. Cl. X.R.

252—522; 260—501.18, 501,19, 563 P, 612 D, 396 N